(12) United States Patent
Qiu et al.

(10) Patent No.: US 12,240,733 B2
(45) Date of Patent: Mar. 4, 2025

(54) ELEVATOR CALLING DEVICE AND ELEVATOR SYSTEM

(71) Applicant: Otis Elevator Company, Farmington, CT (US)

(72) Inventors: Heping Qiu, Shanghai (CN); Shanghua Yang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1474 days.

(21) Appl. No.: 16/723,256

(22) Filed: Dec. 20, 2019

(65) Prior Publication Data

US 2020/0317469 A1    Oct. 8, 2020

(30) Foreign Application Priority Data

Apr. 3, 2019    (CN) .......................... 201910265456.3

(51) Int. Cl.
*B66B 1/46*    (2006.01)
*B66B 3/00*    (2006.01)
*G06F 3/01*    (2006.01)

(52) U.S. Cl.
CPC .............. *B66B 1/468* (2013.01); *B66B 1/462* (2013.01); *B66B 3/004* (2013.01); *G06F 3/016* (2013.01);
(Continued)

(58) Field of Classification Search
CPC ......... B66B 1/468; B66B 1/462; B66B 3/004; B66B 2201/4615; B66B 2201/463;
(Continued)

(56) References Cited

U.S. PATENT DOCUMENTS 5,678,933 A    10/1997  Ouchi et al.
5,679,933 A *  10/1997  Weber ..................... B66B 1/462
                                                                    187/389
(Continued)

FOREIGN PATENT DOCUMENTS

CN    111776897 A  *  10/2020  ............. B66B 1/462
EP     3718940 A1  *  10/2020  ............. B66B 1/462
(Continued)

OTHER PUBLICATIONS

European Search Report for Application No. 19218595.7, Issued Jul. 20, 2020, 5 Pages.

*Primary Examiner* — Jeffrey Donels
(74) *Attorney, Agent, or Firm* — CANTOR COLBURN LLP

(57) ABSTRACT

An elevator-calling device and elevator system. The elevator-calling device includes a processor to receive an input instruction and send a signal to a main controller of an elevator system; a display device connected to the processor; a rotatable button, wherein the rotatable button is connected to the processor, and the rotatable button is pressable and rotatable in a first direction and a second direction opposite to the first direction, and wherein the rotatable button has an initial zero scale; and an assistant sound generating unit connected to the processor; wherein the processor is configured to have an assistant elevator-calling mode, in which a preset target floor is increased when the rotatable button rotates in the first direction, the preset target floor is decreased when the rotatable button rotates in the second direction, and the preset target floor is confirmed when the rotatable button is pressed at a non-zero scale.

11 Claims, 2 Drawing Sheets

(52) U.S. Cl.
CPC . *B66B 2201/4615* (2013.01); *B66B 2201/463* (2013.01)

(58) Field of Classification Search
CPC .......... B66B 1/2408; B66B 2201/4661; B66B 1/461; B66B 1/14; B66B 1/46; G06F 3/016
See application file for complete search history.

(56) References Cited

U.S. PATENT DOCUMENTS

2018/0127234 A1    5/2018  Lofberg et al.
2023/0150795 A1*   5/2023  Walther ................ B66B 1/3461
                                                                187/389

FOREIGN PATENT DOCUMENTS

JP      2016145087 A    8/2016
WO      2005121003 A2   12/2005

* cited by examiner

ELEVATOR CALLING DEVICE AND ELEVATOR SYSTEM

FOREIGN PRIORITY

This application claims priority to Chinese Patent Application No. 201910265456.3, filed Apr. 3, 2019, and all the benefits accruing therefrom under 35 U.S.C. § 119, the contents of which in its entirety are herein incorporated by reference.

FIELD OF THE INVENTION

The present disclosure relates to the field of elevators, and more particularly, the present disclosure relates to an elevator-calling device and an elevator system having the elevator-calling device.

BACKGROUND OF THE INVENTION

Existing elevator systems often include elevator-calling devices arranged at individual floors. A common elevator-calling device is an elevator-calling device having a go-up button and a go-down button, and an elevator car is provided with a panel for setting floors so that a desired destination floor may be set.

Another type of elevator-calling device is an elevator-calling device which is capable of setting a target floor. A main controller of the elevator directly dispatches the elevator to complete the task of transporting passengers based on the target floor. Such an elevator-calling device is typically provided with a single button arranged for the disabled. When a passenger uses the button arranged for the disabled to set the target floor, such as the 9th floor, he/she needs to press the button for one time under the guidance of an assistant sound so as to enter an assistant setting mode, then presses the button for nine times, and after the assistant sound gives a prompt, the passenger presses the button again for confirmation. The button needs to be pressed for eleven times during the entire process, and when a wrong floor is set due to excessive pressing, the entire process needs to be repeated.

SUMMARY OF THE INVENTION

An object of the present disclosure is to solve or at least alleviate the problems existing in the related art.

In one aspect, an elevator-calling device is provided, which includes: a processor, which is configured to receive an input instruction and send a signal to a main controller of an elevator system; a display device connected to the processor; a rotatable button, wherein the rotatable button is connected to the processor, and the rotatable button is pressable and rotatable in a first direction and a second direction opposite to the first direction, and wherein the rotatable button has an initial zero scale; and an assistant sound generating unit connected to the processor; wherein the processor is configured to have an assistant elevator-calling mode, in which a preset target floor is increased when the rotatable button rotates in the first direction, the preset target floor is decreased when the rotatable button rotates in the second direction, and the preset target floor is confirmed when the rotatable button is pressed at a non-zero scale.

According to some embodiments of the elevator-calling device, the processor is configured to enter the assistant elevator-calling mode when the rotatable button is pressed and/or rotated at the zero scale.

According to some embodiments of the elevator-calling device, the rotatable button is configured with a scale tactile sensation when rotating.

According to some embodiments of the elevator-calling device, the processor is configured to, when entering the assistant elevator-calling mode, take the floor on which the elevator-calling device is located or the $1^{st}$ floor as an initial preset target floor, wherein each time the rotatable button rotates by one scale in the first direction, the preset target floor is increased by one, and each time the rotatable button rotates by one scale in the second direction, the preset target floor is decreased by one.

According to some embodiments of the elevator-calling device, the assistant sound generating unit broadcasts a prompt of operation mode when entering the elevator-calling mode.

According to some embodiments of the elevator-calling device, the assistant sound generating unit broadcasts the preset target floor and prompts the user to confirm, when the rotatable button stays at a non-zero scale for more than a preset time t.

According to some embodiments of the elevator-calling device, the rotatable button is provided with a reset mechanism configured to automatically reset the rotatable button to a position of the zero scale after the operation of the rotatable button is completed.

According to some embodiments of the elevator-calling device, a surface of the rotatable button has a Braille and/or a symbol of the disabled.

According to some embodiments of the elevator-calling device, the display device displays the preset target floor in the assistant elevator-calling mode.

According to some embodiments of the elevator-calling device, the rotatable button is a rotary encoder.

According to some embodiments of the elevator-calling device, the display device is touchable for inputting the preset target floor in a normal elevator-calling mode.

In another aspect, an elevator system is provided, which includes: an elevator; a main controller configured to control the elevator; and the elevator-calling device according to the embodiments of the present disclosure disposed at one or more floors.

BRIEF DESCRIPTION OF THE DRAWINGS

Hereinafter, embodiments according to the present disclosure will be explained in connection with the accompanying drawings. With reference to the accompanying drawings, the disclosure of the present application will become easier to understand.

DETAILED DESCRIPTION OF THE EMBODIMENT(S) OF THE INVENTION

Figure 1:
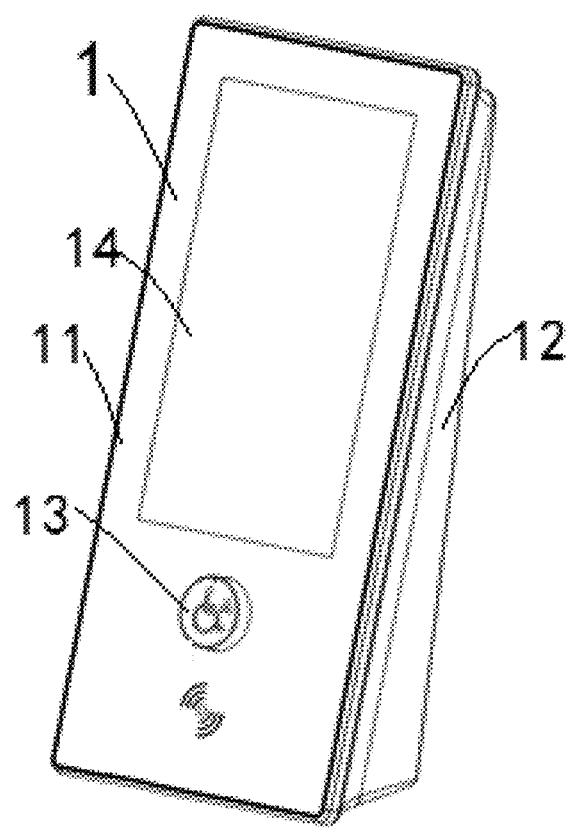
FIG. 1 shows a perspective view of an elevator-calling device according to an embodiment of the present disclosure.

An elevator-calling device according to an embodiment of the present disclosure will be described with reference to FIGS. 1 to 3. As shown in FIG. 1, an elevator-calling device 1 includes a front panel 11 and a back casing 12. The front panel 11 may include a display screen 14 and a rotatable button 13. A circuit board and a processor 16 and an assistant sound generating unit 15 and other components arranged on the circuit board may be disposed in a cavity between the front panel 11 and the back casing 12. Specifically, as shown in FIG. 3, the elevator-calling device 1 further includes the processor 16 and the assistant sound generating unit 15. The processor 16 is configured to receive an input instruction and send an elevator-calling signal and a preset target floor signal to a main controller 2 of the elevator system. The assistant sound generating unit 15 is used for voice broadcasting. The processor 16 is connected to the display device 14, the rotatable button 13, and the assistant sound generating unit 15, respectively, e.g., through an interface, a wire, or a circuit board. In some embodiments, the display device 14 may be, for example, a touchable display device for inputting a preset target floor instruction in a conventional elevator-calling mode. For example, an ordinary person may set a preset target floor through the touchable display device 14. After receiving the input information of the preset target floor, the processor 16 sends an elevator-calling signal and a preset target floor signal to the main controller 2, which then dispatches the elevator to perform this task and transport ordinary passengers to a desired floor.

The rotatable button 13 may be used dedicatedly for the disabled, such as blind or deaf or dumb person. The rotatable button 13 is connected to the processor 16 and is pressable and rotatable in a first direction (such as clockwise) and a second direction (such as counterclockwise) opposite to the first direction. The rotatable button 13 has an initial zero scale, that is, the rotatable button 13 is located at the zero scale when not operated. The processor 16 is configured to have an assistant elevator-calling mode to serve the disabled. In some embodiments, the assistant elevator-calling mode may be entered by pressing the rotatable button at the zero scale and/or by rotating the rotatable button; in other words, in different systems, the processor 16 may be configured to enter the assistant elevator-calling mode when the rotatable button is pressed, or enter the assistant elevator-calling mode when the rotatable button is rotated, or enter the assistant elevator-calling mode by using any of the above methods. In some embodiments, the assistant elevator-calling mode may also be entered by means of sound acquisition and the like. In the assistant elevator-calling mode, the preset target floor is increased when the rotatable button rotates in the first direction, the preset target floor is decreased when the rotatable button rotates in the second direction, and the preset target floor is confirmed when the rotatable button is pressed again at a non-zero scale. Since the embodiment of the present disclosure uses a pressable and rotatable button in place of the design of a single button, it is friendly to the disabled such as the blind person, and the elevator-calling and the setting of the preset floor can be realized by for example merely pressing the button for two times and rotating the button for one time during the entire elevator-calling process. In addition, even in case of misoperation in which the button is rotated to a wrong floor, it is only required to continue to rotate the button for example in the opposite direction so that the correct floor can be selected again, and there is no need to reselect.

Figure 2:
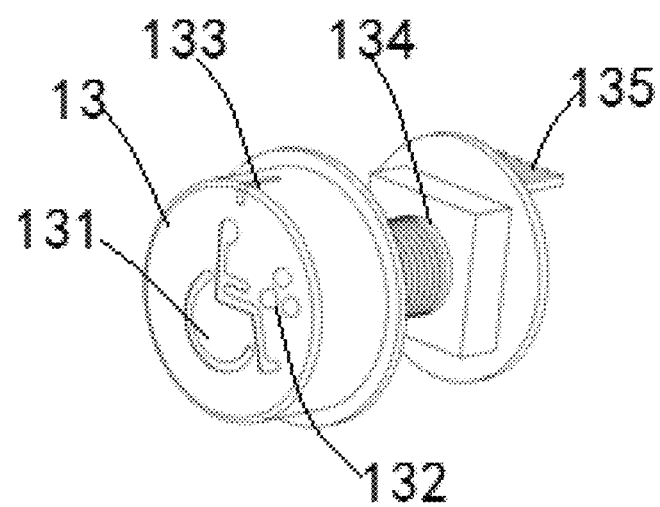
FIG. 2 shows a perspective view of a rotatable button of an elevator-calling device according to an embodiment of the present disclosure.
Figure 3:
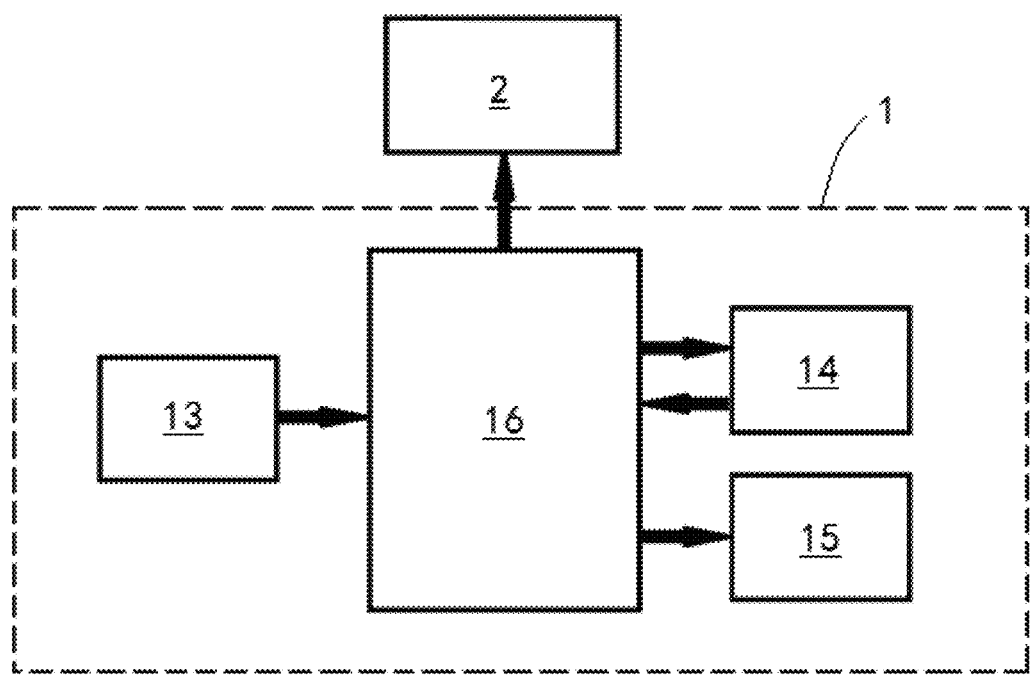
FIG. 3 shows a schematic structural view of an elevator system according to an embodiment of the present disclosure.

With continued reference to FIG. 2, in some embodiments of the present disclosure, the rotatable button 3 may include a cover portion and a button body. The cover portion may have a Braille 132 and/or a symbol 131 of the disabled and a symbol 133 of the zero scale. When the rotatable button 3 is not rotating, the symbol 133 of the zero scale may face upward, and the Braille 132 and/or the symbol 131 of the disabled may be well oriented. In some embodiments, the rotatable button 13 may be provided with a reset mechanism such as a reset spring, which is configured to automatically reset the rotatable button 13 to a position of the zero scale after the operation of the rotatable button 13 is completed.

In some embodiments, the body 134 of the rotatable button 13 may be a rotary encoder having a connection port 135 for connecting to, for example, a circuit board. The rotary encoder may send a specific combination of different signals when rotating by each scale in a forward or reverse direction. For example, when the rotatable button 13 rotates by one scale clockwise, the encoder outputs signals "01", "00", "10" and "11" in sequence; when the rotatable button 13 rotates by one scale counterclockwise, the encoder outputs signals "10", "00", "01" and "11" in sequence; and the processor 16 increases or decreases the preset target floor based on the combination of signals. In some embodiments, the rotatable button 13 is configured with a scale tactile sensation when rotating, that is, a tactile sensation is fed back to the user each time the rotatable button 13 rotates by a scale, so that a blind person can sense the number of adjusted scales by touching and the corresponding adjustment amount of the preset target floor. In some embodiments, the processor 16 is configured to take the floor of the elevator-calling device as the initial preset target floor when entering the assistant elevator-calling mode, wherein each time the rotatable button rotates by a tactile scale in the first direction, the preset target floor is increased by one, and each time the rotatable button rotates by a tactile scale in the second direction, the preset target floor is decreased by one. Alternatively, the $1^{st}$ floor may also be used as the initial preset target floor. In some embodiments, the assistant sound generating unit 15 sends a prompt of operation mode when entering the assistant elevator-calling mode, for example, it broadcasts an operation guidance to inform the operator how to operate. For example, it may broadcast "Please set a preset floor by rotating the button, the floor will be increased by clockwise rotation, and will be decreased by counterclockwise rotation". In some embodiments, the assistant sound generating unit broadcasts the preset target floor and prompts the user to confirm, when the rotatable button 3 stays at a non-zero scale for more than a preset time t. For example, in the assistant elevator-calling mode, if the user rotates the rotatable button 3 and holds it for t seconds, such as 1 second, 1.5 seconds, etc., then the assistant sound generating unit may ask, for example, "Do you want to go to the $L^{th}$ floor, please press the button to confirm", etc. At this point, if the user deems that the floor is not the floor he/she wants to go to, he/she may continue to rotate the rotatable button 13 until the floor he/she wants to go to is found. In some embodiments, the display device 14 displays the preset target floor in the assistant elevator-calling mode, so that a non-blind person or other person may confirm the preset target floor.

An application scenario of the elevator-calling device according to some embodiments of the present disclosure may be assumed as follows. If a disabled person, such as a blind person, wants to go from the A floor such as the $5^{th}$ floor to the B floor such as the $2^{nd}$ floor, then he/she presses the rotatable button 13 to enter the assistant elevator-calling mode. At this point, the display device 14 displays that the initial preset target floor is the $5^{th}$ floor, and the assistant sound generating unit 15 broadcasts the operation guidance. Subsequently, the blind person may rotate the rotatable button 13 counterclockwise so that it passes by three scales. Since the scale provides a tactile sensation, the blind person can sense the number of scales rotated by. When the rotatable button 13 rotates to the scale and pauses for 1 second, the assistant sound generating unit 15 broadcasts "Do you want to go to the $2^{nd}$ floor, please press the button to confirm", and then the blind person presses the button. The processor 16 receives the input instruction, and sends the elevator-calling signal and the preset target floor signal to the main controller 2. The main controller 2 dispatches the elevator to perform the current task and transport the blind person to the $2^{nd}$ floor. Even if one excessive scale is rotated by when the blind person rotates the rotatable button 13, the assistant sound generating unit 15 still broadcasts "Do you want to go to the $1^{st}$ floor, please confirm". In this case, the blind person may further rotate the rotatable button 13 clockwise by one scale, and then press the button without reselecting. It can be seen that the elevator-calling device according to the embodiment of the present disclosure is simple to operate and is friendly to the disabled.

In another aspect, an elevator system is further provided, which includes: one or more elevators; a main controller configured to control the one or more elevators; and the elevator-calling device according to the embodiments of the present disclosure disposed at one or more floors.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. It should be understood that these modifications or changes should be included within the scope of protection of the present disclosure.

What is claimed is:

1. An elevator-calling device, comprising:
   a processor, which is configured to receive an input instruction and send a signal to a main controller of an elevator system;
   a display device connected to the processor;
   a rotatable button, wherein the rotatable button is connected to the processor, and the rotatable button is pressable and rotatable in a first direction and a second direction opposite to the first direction, and wherein the rotatable button has an initial zero scale; and
   an assistant sound generating unit connected to the processor;
   wherein the display device is touchable for inputting a target floor in a normal elevator-calling mode;
   wherein the processor is configured to have an assistant elevator-calling mode, in which a preset target floor is increased when the rotatable button rotates in the first direction, the preset target floor is decreased when the rotatable button rotates in the second direction, and the preset target floor is confirmed when the rotatable button is pressed at a non-zero scale.

2. The elevator-calling device according to claim 1, wherein the processor is configured to enter the assistant elevator-calling mode when the rotatable button at the zero scale is pressed and/or rotated.

3. The elevator-calling device according to claim 1, wherein the rotatable button is configured with a scale tactile sensation when rotating.

4. The elevator-calling device according to claim 3, wherein the processor is configured to, when entering the assistant elevator-calling mode, take the floor on which the elevator-calling device is located or the $1^{st}$ floor as an initial preset target floor, and wherein each time the rotatable button rotates by one scale in the first direction, the preset target floor is increased by one, and each time the rotatable button rotates by one scale in the second direction, the preset target floor is decreased by one.

5. The elevator-calling device according to claim 1, wherein the assistant sound generating unit broadcasts a prompt of operation mode when entering the elevator-calling mode.

6. An elevator-calling device, comprising:
   a processor, which is configured to receive an input instruction and send a signal to a main controller of an elevator system;
   a display device connected to the processor;
   a rotatable button, wherein the rotatable button is connected to the processor, and the rotatable button is pressable and rotatable in a first direction and a second direction opposite to the first direction, and wherein the rotatable button has an initial zero scale; and
   an assistant sound generating unit connected to the processor;
   wherein the processor is configured to have an assistant elevator-calling mode, in which a preset target floor is increased when the rotatable button rotates in the first direction, the preset target floor is decreased when the rotatable button rotates in the second direction, and the preset target floor is confirmed when the rotatable button is pressed at a non-zero scale;
   wherein the assistant sound generating unit broadcasts the preset target floor and prompts the user to confirm, when the rotatable button stays at a non-zero scale for more than a preset time t.

7. An elevator-calling device, comprising:
   a processor, which is configured to receive an input instruction and send a signal to a main controller of an elevator system;
   a display device connected to the processor;
   a rotatable button, wherein the rotatable button is connected to the processor, and the rotatable button is pressable and rotatable in a first direction and a second direction opposite to the first direction, and wherein the rotatable button has an initial zero scale; and
   an assistant sound generating unit connected to the processor;
   wherein the processor is configured to have an assistant elevator-calling mode, in which a preset target floor is increased when the rotatable button rotates in the first direction, the preset target floor is decreased when the rotatable button rotates in the second direction, and the preset target floor is confirmed when the rotatable button is pressed at a non-zero scale;
   wherein the rotatable button is provided with a reset mechanism configured to automatically reset the rotatable button to a position of the zero scale after the operation of the rotatable button is completed.

8. The elevator-calling device according to claim 1, wherein a surface of the rotatable button has a Braille and/or a symbol of the disabled.

9. The elevator-calling device according to claim 1, wherein the display device displays the preset target floor in the assistant elevator-calling mode.

10. The elevator-calling device according to claim 1, wherein the rotatable button is a rotary encoder.

11. An elevator system, comprising:
    an elevator;
    a main controller configured to control the elevator; and the elevator-calling device according to claim 1 disposed at one or more floors.

* * * * *